(12) United States Patent
Krohn

(10) Patent No.: US 9,442,204 B2
(45) Date of Patent: Sep. 13, 2016

(54) SEISMIC INVERSION FOR FORMATION PROPERTIES AND ATTENUATION EFFECTS

(71) Applicant: Christine E. Krohn, Houston, TX (US)

(72) Inventor: Christine E. Krohn, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 571 days.

(21) Appl. No.: 13/941,312

(22) Filed: Jul. 12, 2013

(65) Prior Publication Data

US 2014/0039799 A1     Feb. 6, 2014

Related U.S. Application Data

(60) Provisional application No. 61/680,049, filed on Aug. 6, 2012.

(51) Int. Cl.
| | |
|---|---|
| *G01V 1/28* | (2006.01) |
| *G01V 1/34* | (2006.01) |
| *G01H 17/00* | (2006.01) |
| *G06F 17/40* | (2006.01) |
| *G06F 19/00* | (2011.01) |
| *G01V 1/30* | (2006.01) |
| *G01V 1/36* | (2006.01) |

(52) U.S. Cl.
CPC .............. *G01V 1/282* (2013.01); *G01H 17/00* (2013.01); *G01V 1/28* (2013.01); *G01V 1/306* (2013.01); *G01V 1/34* (2013.01); *G01V 1/368* (2013.01); *G01V 2210/41* (2013.01); *G01V 2210/582* (2013.01); *G01V 2210/584* (2013.01); *G01V 2210/67* (2013.01); *G06F 17/40* (2013.01); *G06F 19/00* (2013.01)

(58) Field of Classification Search
None
See application file for complete search history.

(56) References Cited

U.S. PATENT DOCUMENTS

| | | | |
|---|---|---|---|
| 5,550,786 A | 8/1996 | Allen | |
| 6,516,275 B2 | 2/2003 | Lazaratos | |
| 7,072,767 B2 * | 7/2006 | Routh | G01V 1/28 702/14 |
| 7,436,734 B2 | 10/2008 | Krohn | |
| 7,719,923 B2 | 5/2010 | Volterrani | |
| 8,553,498 B2 * | 10/2013 | Hu | G01V 1/30 367/38 |
| 2002/0141287 A1 * | 10/2002 | Lazaratos | G01V 1/362 367/120 |
| 2004/0199330 A1 * | 10/2004 | Routh | G01V 1/28 702/14 |
| 2006/0250891 A1 * | 11/2006 | Krohn | G01V 1/005 367/38 |
| 2007/0280050 A1 * | 12/2007 | Volterrani | G01V 1/28 367/73 |
| 2011/0273961 A1 | 11/2011 | Hu | |
| 2016/0003957 A1 * | 1/2016 | Norris | G01V 1/38 367/24 |

OTHER PUBLICATIONS

U.S. Appl. No. 61/609,596, filed Mar. 12, 2012, Norris et al.
Bickel, S.H. et al. (1985), "Plane-wave Q deconvlution," *Geophysics* 50(9), pp. 1426-1439.
Oldenburg, D,W. et al. (1981), "Wavelet estimation and deconvolution," *Geophysics* 46(11), pp. 1528-1542.

(Continued)

*Primary Examiner* — Edward Cosimano
(74) *Attorney, Agent, or Firm* — ExxonMobil Upstream Research-Law Department

(57) ABSTRACT

Method for inverting seismic data to obtain reflection properties by estimating or measuring (301) the source signature for the seismic data, then inverting (302) simultaneously for subsurface formation properties or reflection properties and for the amplitude attenuation and velocity dispersion effects integrated over the raypath from the source to the reflectors and to the receiver.

13 Claims, 7 Drawing Sheets

(56) References Cited

OTHER PUBLICATIONS

Oldenburg, D,W. et al. (1983), "Recovery of the acoustic impedance from reflections seismograms," *Geophysics* 48(10), pp. 1318-1337.
Osman et al. (1996), "Seismic source signature estimation and measurement," *Geophysics* reprint series No. 18, pp. 1-14.
R.E. Sheriff, Encyclopedic Dictionary of Applied Geophysics, $4^{th}$ edition, p. 67.
Ziolkowski, A. et al. (1991), "Why don't we measure seismic signatures?," *Geophysics* 56(2), pp. 190-201.
Ziolkowski, A. et al. (1993), "Determination of the signature of a dynamite source using source scaling, Part 2: Experiment," *Geophysics* 58(8), pp. 1183-1194.

* cited by examiner

SEISMIC INVERSION FOR FORMATION PROPERTIES AND ATTENUATION EFFECTS

CROSS-REFERENCE TO RELATED APPLICATION

This application claims the benefit of U.S. Provisional Patent Application 61/680,049, filed Aug. 6, 2012, entitled SEISMIC INVERSION FOR FORMATION PROPERTIES AND ATTENUATION EFFECTS, the entirety of which is incorporated by reference herein.

FIELD OF THE INVENTION

This invention relates generally to the field of geophysical prospecting and, more particularly, to seismic data processing. Specifically, the invention is a method for inverting seismic data to infer formation properties and attenuation effects.

BACKGROUND OF THE INVENTION

Seismic inversion is a process of estimating from seismic data a model of subsurface formation properties, such as its reflectivity or acoustical impedance. Typically, a convolutional model is assumed in which the data are given by the seismic wavelet convolved with a reflectivity series. A problem for inversion is that the seismic wavelet is unknown, and in addition, both the data and wavelet are band limited. The present invention overcomes these problems by first measuring or estimating the signature of the source, i.e. the seismic wavelet before any attenuation has occurred, and then solving simultaneously for both reflection or rock properties and for amplitude attenuation and velocity dispersion, caused by propagation through the earth from the source to the reflectors and to the receiver. The present invention overcomes problems with wavelet uncertainty, time varying or changing seismic wavelets, the presence of noise in the inversion window, and lack of low frequencies. In addition, the present invention estimates the attenuation quality factor of the earth, which can provide further information about subsurface rock and fluid properties.

The Convolutional Model

Seismic inversion is a process of estimating a model of subsurface properties, such as the reflectivity or acoustical impedance, from seismic data. Inversion may be performed using raw data or processed seismic data, in which the processing may include migration or stacking. Typically, the model is assumed to be a convolutional model, which assumes a linear rock-physics relationship between stress and strain and Newton's laws of mechanics. The convolutional model is implied in most seismic processing and interpretation (See R. E. Sheriff, *Encyclopedic Dictionary of Applied Geophysics*, 4$^{th}$ edition, p. 67).

The convolutional model is expressed as a seismic trace p(t) being a convolution of an embedded (equivalent wavelet) w(t) with a reflectivity function r(t), plus noise n(t).

$$p(t) = w(t) * r(t) + n(t), \quad (1)$$

where the symbol * donates the convolution operator. The reflectivity r(t) typically represents the change in impedance at the edge of each bed or layer in the subsurface as a function of two-way travel time, but it may include different rock physics parameters. A reflectivity series can be estimated from well logs, and then Eq. 1 can be used to derive a synthetic seismic trace, called the seismic-well tie, using an estimate of the seismic wavelet. The simple inverse operation of dividing the data in frequency domain by the convolution wavelet is called deconvolution. Amplitude losses or attenuation is generally ignored in the model and in the inversion. Attenuation causes considerable loss of high frequencies, and thus a wavelet that changes with greater propagation distance and longer times. Consequently, the inversion is usually performed using small time windows, in which the seismic wavelet appears stationary or unchanging. The seismic data may also be preprocessed to partially compensate for attenuation effects, but since the attenuation is unknown, this compensation is not accurate.

It is well known that this practice of using Eq. 1 for inversion to obtain the reflectivity has a number of problems. The chief problem is that the wavelet, particularly its phase, is unknown. In addition, both the data traces p(t) and the wavelet w(t) are band limited, but the desired reflectivity is not. Because both reflectivity and the wavelet are unknown, assumptions are generally made about the reflectivity, the most common being that it is "white" and has no frequency dependence. These problems are compounded by the fact that what is desired is not the reflectivity, i.e. the change in seismic impedance at interfaces, but its integral or the formation seismic impedance. Seismic impedance can be estimated by dividing (or inverting) the seismic trace by the wavelet and integrating over time, but missing low-frequencies are especially problematic.

Problems with missing low frequencies are illustrated in FIGS. 1A-1F. As shown in FIG. 1A, a source signature is assumed with an amplitude spectrum 101 that is missing low and high frequencies. An earth model including attenuation is assumed and a synthetic seismic trace is computed to give 103 (FIG. 1C). Dividing by the wavelet, and integrating the seismic trace gives the integrated trace 104 (FIG. 1D), which is a poor estimate of the true earth impedance, which is shown as 105. Seismic sources typically lack low-frequencies down to 0.1 Hz, but if we assume such a source with a source signature given by 102 (FIG. 1B) and the corresponding broad-band seismic trace 106 (FIG. 1E), then the integrated trace 107 better matches the seismic impedance 105. It differs because the trace still includes attenuation effects. It should be noted that there is no commercial seismic source that can generate the broadband signature shown in 102. The desire for such a source is well known, and this area is an active area of research. Making an active source with such low-frequencies is very difficult. The present invention is a way to overcome the need for such sources.

In order to obtain a realistic impedance section from narrow-band data, Oldenburg, et al. (*Geophysics* 48, 1318-1337 (1983)) made a different assumption to solve the inversion problem. He proposed what is today called a sparse-spike inversion in which the reflectivity is assumed to be made up of a spikes or delta functions for a small number N layers.

$$p(t) = w(t) * \sum_{k=1}^{N} z_k \delta(t - \tau_k) \quad (2)$$

In this equation and subsequent equations, noise is ignored. Sparse spike inversion is illustrated in FIG. 2. This inversion is nonlinear and must be solved iteratively or recursively using model optimization methods. In this case, the unknown model parameters ($z_k$ and $t_k$, plotted in 203) as well as the wavelet w(t) (202) are determined that minimize the misfit between the observed data $p_{obs}(t)$ and the model synthetic $p_{mod}(t)$ (201) to some power L.

$$\|p_{obs}(t)-p_{mod}(t)\|^L=\text{minimum} \quad (3)$$

The value L=1, the absolute-value norm, is preferred over the least-square norm L=2. It is well known that using the L=1 norm (or "L1" norm) yields a sparse or small number of events, and inversion with the L1 norm is called sparse inversion. When the wavelet is known and is completely stationary, i.e. for model data, then the full impedance can be obtained from the inversion without the need for low frequencies as shown by Oldenburg. Effectively, the reflectivity is assumed to be independent of frequency and the wavelet is stationary and contains all the frequency variation. This assumption is not valid for field data.

Sparse-spike inversion is currently one of the most rigorous methods for post-migration inversion that results in blocky realistic impedance sections, and a version is available in a number of commercial inversion software packages. It is known to be able to partially extend the band to lower frequencies for field data, but most often it is run in a band-limited mode or with a low-frequency model supplied by the interpreter or from well logs (see for example, Volterrani, U.S. Pat. No. 7,719,923). Sparse-spike inversion is usually performed post-migration as a 1-D inversion on stacked data or as a multiple-trace AVO-type inversion on prestack data as described by Routh, et al. (U.S. Pat. No. 7,072,767).

The fact that the wavelet is unknown limits inversion methods using the convolutional model and sparse-spike inversion in particular. A number of methods attempt to solve for the wavelet along with the reflectivity as described by Routh, et al. (U.S. Pat. No. 7,072,767), but constraints and assumptions are required. Oldenburg et al. (*Geophysics* 46, 1528-1542 (1981)) and others show that the solution is non-unique. More commonly, the wavelet amplitude spectrum is estimated from the seismic data, and the well-seismic tie is used to estimate its phase. A small variation in wavelet amplitude at the low-frequency edge of the band has a large effect on the phase of the data, especially for minimum-phase data, and accurately estimating the phase of the wavelet is very difficult. Thus, well data is desired, but even with well data, uncertainty regarding the wavelet remains.

Problems with the inversion also arise from the stationary assumption for the wavelet. This assumption means that the inversion can only be performed in isolated small time windows. If there are two targets at different times, then the inversion is performed separately for the two targets, and the output merged. The presence of noise, such as multiples or surface waves, within the window can compromise the results, because these events have different raypaths than the primary reflections and thus different effective wavelets. A more fundamental problem is that a small time window corresponds to poor resolution in frequency. This lack of frequency resolution will limit the effectiveness of the spike assumption and the ability to capitalize on the expectation that reflection coefficients are frequency independent.

Source-Signature Deconvolution

In its most general form, the convolutional model relates the response at a receiver p(t) to the source signature s(t) convolved with the impulse response of the earth g(t), normally called the Green's function, plus noise n(t).

$$p(t)=s(t)*g(t)+n(t) \quad (4)$$

Source signature deconvolution is the process of removing the source signature, which must be known. It cannot be completely removed, since it is bandlimited, but it can be replaced with a more desirable bandlimited impulse response. For example, the signature from marine airgun sources is complex and ringy, because of oscillations of the air bubble and ghost effects from the ocean surface. A deep-water signature is sometimes recorded using a deep tow hydrophone or the signature is determined by modeling the response of an array of guns, each with a measured signature. The signature is then use to deconvolve the data to remove the effects of the bubble and ghost to generate data as if it had been recorded with a source with a more desirable pulse. The deconvolution filter is applied to the complete trace. It may also be used to shape the data to a desired zero-phase pulse.

Use of Source-Signatures in Inversion

Ziolkowski ("Why don't we measure seismic signatures?" *Geophysics* 56, 190-201 (1991)) proposed measuring the source signature citing problems with the traditional use of the convolutional model (Eq. 1). He concludes that the convolutional model cannot fit the reality of a changing convolutional wavelet in which the signature changes as it propagates through an absorbing earth. He points out that many geophysicists are unaware of possible ways to determine source signatures and discussed possible methods. A specific method to use the source signature for inversion of reflectivity was not provided.

Equation 4 can be rewritten as $$p(t)=s(t)*(\text{attenuation}(t))*r(t)+n(t), \quad (5)$$

where now the response of the earth (the Green's Function) is decomposed into the reflectivity function as in Eq. 1 and propagation effects due to both absorption and interbedded multiples. (See Osman and Robinson, introduction in *Geophysics* reprint series No. 18, "Seismic Source Signature Estimation and Measurement," pp. 1-14 (1996).). It can be recognized that from Eq. 5 and Eq. 1 that the inversion wavelet is given by $$w(t)=s(t)*(\text{attenuation}(t)). \quad (6)$$

The effective attenuation in Eq. 6 is ray-path dependent and changes along the ray-path and with distance travelled. Thus, the wavelet changes with ray-path distance and with time, requiring use of small time windows in inversion. For example, the effective wavelet will be different for different offsets used for AVO inversion methods because of increased attenuation over the longer offsets compared to the nearer offsets. Lazaratos (U.S. Pat. No. 6,516,275) teaches a method to spectrally balance the near and far offset seismic data to account for simple attenuation effects and for the processing filter of NMO stretch. Lazaratos determines attenuation compensation, assuming a single effective Q value, which along with the NMO-stretch compensation makes the spectrum of the near and offset traces match. Once the data are spectrally compensated, then a single wavelet can be used to perform AVO inversion.

Equation 6 is not used to derive a wavelet for inversion for reflectivity. In addition to problems with measuring the source signature, attenuation is unknown and difficult to estimate from surface seismic data. Attenuation, or Q, is most often measured by differences in the amplitude spectra measured by geophones at two depths in the earth, for example by a Vertical Seismic Profile. One of the problems for surface seismic data is there is no reference provided by measurements at two different depths from which a change in attenuation is determined Another problem is amplitude spectra are also affected by the interference of multiple events in a time window. Q estimation from surface seismic data has been largely limited to characterizing anomalous high attenuation regions in shallow sections, for example using Q tomography to estimate attenuation from shallow gas pockets (Hu, US Patent Application 2011/0273961). Accurate measurements of attenuation for reservoir zones could be used to improve processing and attenuation compensation. In addition, measurements of attenuation could provide useful information about reservoir rock and fluid properties. For example, attenuation may be related to the permeability of reservoir formations.

Accordingly, there is a need for an improved seismic inversion method, one that avoids problems with wavelet uncertainty and changes in the wavelet with time. The improved seismic inversion method should also be able to: invert the full trace without relying on small time windows, be robust with respect to noise or other events recorded at the same time as the primary reflections, have less need for well information, and potentially recover some of the low-frequency information. In addition, a measure for attenuation would be beneficial both to improve processing, i.e. compensation for attenuation, or to provide further information about the subsurface formations.

SUMMARY OF THE INVENTION

In one embodiment, the invention is a computer-implemented method for inverting seismic data to obtain reflection properties of a subsurface region, comprising: (a) estimating or measuring a source signature for the seismic data; and (b) using the source signature, inverting the seismic data simultaneously for a subsurface formation or reflection property and for amplitude attenuation and optionally also for velocity dispersion effects integrated over a ray-path from source to reflectors and to a receiver; wherein, at least the inversion is performed using a computer. In some embodiments of the invention, the inversion may use causality relationships to constrain the values for unknown variables or to reduce their number in the inversion.

Like most or all seismic data processing methods, the present invention transforms seismic data into a much more interpretable model of the subsurface than can be obtained from the raw data.

BRIEF DESCRIPTION OF THE DRAWINGS

The present invention and its advantages will be better understood by referring to the following detailed description and the attached drawings in which.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims. Persons skilled in the technical field will readily recognize that in practical applications of the present inventive method, the method must be performed on a computer programmed in accordance with the teachings herein.

DETAILED DESCRIPTION OF EXAMPLE EMBODIMENTS

This invention utilizes the expectation that the seismic experiment is an actual physical experiment, and all associated earth effects such as attenuation filters, and source or receiver coupling are physical. In particular they are causal, meaning that no energy exists before the excitation of the source and no energy is detected at the receiver before arrival of the seismic wave. In processing, we apply filters that may not be causal such as correlating vibrator data by the reference sweep function, but these filters are known and can be accounted for in the inversion process. When we apply such filters, e.g. a zero-phasing filter, to data, the data actually become mixed phase, but the filters representing the underlying earth processes should still be physical and causal. This realization gives a powerful tool for estimating these effects. As is well known in mathematics, causality means that the amplitude and phase are not independent but are linked through Kramers-Kronig relationships; this expectation provides additional information to constrain the inverted results.

Starting from Eqs. 1 and 6, the convolutional model is rewritten as:

$$p(t)=w(t)*r(t)=\{s(t)*e_q(t)\}*r(t). \tag{7}$$

Figure 3:
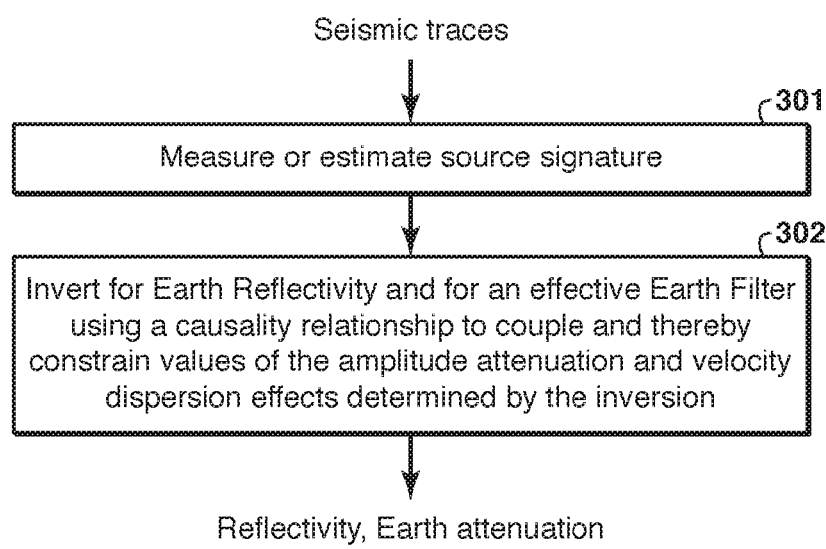
FIG. 3 is a flowchart showing basic steps in one embodiment of the present inventive method.

Using the commutative property of multiplication, this becomes $$p(t)=s(t)*\{e_q(t)*r(t)\}. \tag{8}$$

where $e_q(t)$ is the effective earth filter, which is not fixed but changes with time. Note that in Eq. 8 the terms within the brackets, i.e. the effective earth filter and the reflectivity series, are both properties of the earth. This invention is a method to determine both of these simultaneously by inversion, assuming a known source signature. FIG. 3 illustrates basic steps for using Eq. 8 in inversion. In step 301, the source signature is measured or estimated. Then in step 302, model optimization or iterative inversion is used to solve Eq. 8 simultaneously for reflection or rock properties (e.g. velocity or acoustic impedance) and for the effective earth filter. The earth filter includes effects, such as amplitude attenuation and velocity dispersion, related to propagation through the earth from the source to the reflector and its effects should increase with time or propagation distance. Step 302 may also assume a causality constraint for the earth filter such that the amplitude attenuation and velocity dispersion are coupled.

The method can be performed for a single trace or may be performed simultaneously for a plurality of traces. In addition, the inversion may be performed for raw data or data that has been preprocessed by migration or other filters. In the latter case, the effects of these processing filters (e.g. NMO stretch) should be accounted for in the inversion. The model optimization step 302 and the cost function (e.g., Eq. 3) used in that step should preferably include regularization, additional constraints and bounds. For example, the earth filter may be constrained to be a smooth function of time. Or if the inversion is performed for a plurality of traces, the reflectivity and earth filter may be constrained to be smooth functions trace to trace. In addition, expectations for the behavior of the reflectivity or earth filter based on knowledge of the formations may be incorporated.

Note that in Equation 8 and in step 302, the source signature is considered to be known. The unknowns, the reflectivity and earth filter, are both related to propagation of the seismic wave through the earth and are a function of time or depth. It is also within the scope of the invention to optionally solve for a causal or minimum-phase coupling filter or transfer function that relates the actual source signature to the measured source signature. A similar assumption was made by Allen (U.S. Pat. No. 5,550,786) who used spiking deconvolution to correct for this residual transfer function.

Estimate of Source Signature—Step 301

This section describes ways in which the source signature can be estimated. The preferred method is to have measurements related to the signature for each shot or each excitation of the source, but this is not required. Examples of these shot-to-shot measurements include recording the ground force signature on a vibrator (the mass weighted sum of the output of accelerometers on the reaction mass and on the baseplate), the output of a near-field hydrophone for a marine airgun array, or the full waveform from an uphole geophone for dynamite sources. Other data related to the near surface conditions or first-arrival events may also be useful.

The far-field signature for marine airgun arrays is sometimes recorded in deep water by a deeply towed hydrophone, but can be estimated with commercial software packages that combine previously determined signatures for each individual gun in a gun array. Alternatively, the far-field signature may be estimated from measurements of direct arrivals; see Norris et al., U.S. Provisional Patent Application 61/609,596. These far-field signatures could be used as an estimate of the source signature. It may be useful to modify or scale the amplitudes for these signatures for each shot based on measurements of a near-field hydrophone or reflections from the waterbottom.

Measuring a good source signature for land dynamite can be difficult. Preferably a signature is estimated by selecting a narrow window around the first arrivals for some near-offset traces and computing the average amplitude spectrum. This amplitude spectrum is taken as the amplitude of the source signature. The phase is then computed by assuming that the signature and data are minimum phase. A standard method to compute the phase is to take the Hilbert transform of the logarithm of the amplitude spectrum. It may also be possible to use the recordings made from uphole geophones located at the ground surface above the shot, or the method described by Ziolkowski (*Geophysics* 58, pp. 1183-1194 (1993)).

As taught by Krohn (U.S. Pat. No. 7,436,734), a good estimate of a vibrator signature is the time derivative of the ground-force signal on the vibrator. Even without the ground-force signals, the derivative of the sweep reference function can be an estimate of the source signature, because the vibrator controller uses feedback to match the ground-force to the reference. Inversion can be done with uncorrelated data or with correlated data. For example, with uncorrelated data, the source signature in Eq. 8 is equal to the time derivative of the ground force g(t).

$$\text{Uncorrelated data} = (u(-t)*p(t)) = \partial/\partial t(g(t))*\{e_q(t)*(r(t)\}, \text{ where } s(t) = \partial/\partial t g(t) \quad (9)$$

If Eq. 9 is cross-correlated with the sweep reference u(t), one gets $$\text{Correlated data} = (u(-t)*p(t)) = (u(-t)*\partial/\partial t(g(t))*\{e_q(t)*r(t)\} = \partial/\partial t(u(-t)*g(t))*\{e_q(t)*r(t)\}, \quad (10)$$

where the correlation operator is recognized as the convolution of the reverse time function of the sweep reference. Now with the correlated data, the new source signature can be recognized as the function in front of the brackets or the time derivative of the cross-correlation of the reference signal with the ground force signal.

$$s(t) = \partial/\partial(u(-t)*g(t)) \quad (11)$$

Alternatively, if the ground-force signal is not recorded, then sweep function can be used an approximation for the ground force. If one substitutes u(t)=g(t), one obtains:

$$\text{Correlated data} = u(-t)*p(t) = (\partial/\partial t)(u(-t)*u(t))*(e_q(t)*r(t)). \quad (12)$$

The source signature can now be recognized as the time derivative of the autocorrelation of the sweep reference function.

$$s(t) = \partial/\partial t(u(-t)*u(t)) \quad (13)$$

Sparse Spike Inversion with Attenuation—Step 302

Figure 1A:
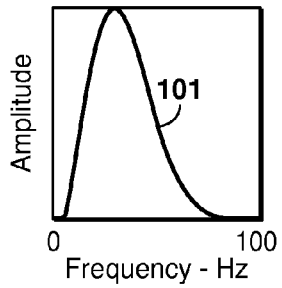
FIGS. 1A-1F illustrate a model example, including source amplitude spectra, data traces and integrated traces, comparing a band-limited source (1A, 1C, 1D) to a source that contains low frequencies (1B, 1E, 1F)
Figure 1B:
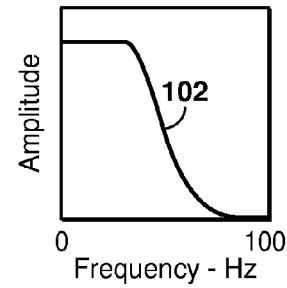
Figure 1C:
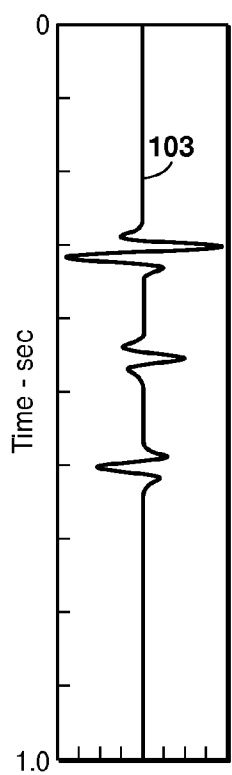
Figure 1D:
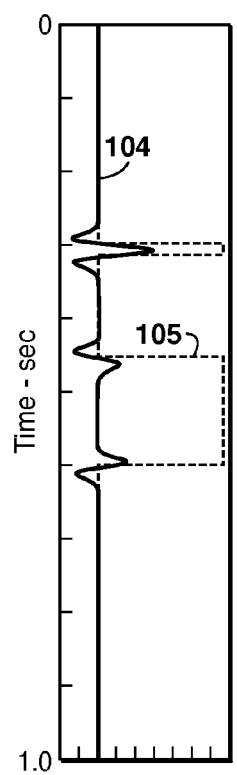
Figure 1E:
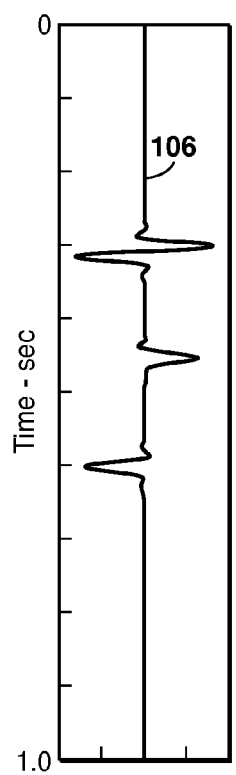
Figure 1F:
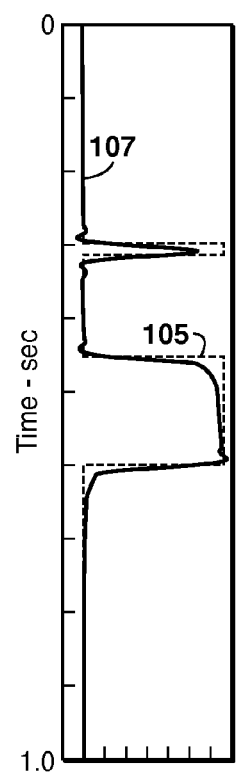
Figure 2:
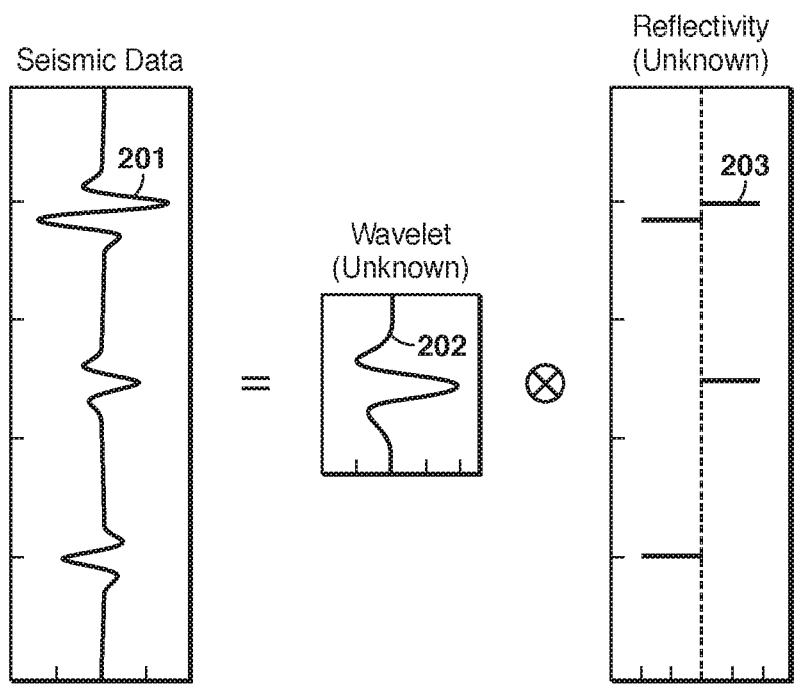
FIG. 2 is an illustration of the convolutional model according to the prior art.

Next is presented a preferred embodiment of the present inventive method, which is based on sparse-spike inversion using Equation 2. Instead of a time-invariant wavelet convolved with a reflectivity time series (FIG. 2 and Eq. 2), this invention reassumes that the data is the convolution of a known source wavelet s(t) and the sum of individual local impedance contrast (reflection) events $z_k$, each modified with an earth filter $F(\alpha_k, \tau_k)$, which is a function of effective attenuation $\alpha_k$ and two-way travel time $\tau_k$. Equation 8 is rewritten as:

$$p(t) = s(t) * \sum_{k=1}^{N} z_k F(\alpha_k - \tau_k) \quad (14)$$

The earth filter is different for each event k depending on its raypath and includes both the time delay part of the reflectivity series $\tau_k$ and effective attenuation $\alpha_k$. In other words, the travel time for each reflection is determined by the average velocity over the raypath, and the effective attenuation is also an average of attenuation over the raypath. The parameter $z_k$ is related to local reflection coefficients or impedance contrasts for each interface, but it may include amplitude loss from spherical spreading along the raypath.

One specific implementation for the function $F(\alpha_k, \tau_k)$ assumes that attenuation is related to an effective quality factor Q, which is constant as a function of frequency. (Note that any such relationship can be used. For example, the earth filter may incorporate a Q as a function of frequency or frequency to some power, and different functions may be used for different frequency ranges.) Now with this particular assumption, the parameters $\alpha_k = 1/Q_k$. Then further assuming causality, the formulation of Bickel and Natarajan (*Geophysics* 50, 538-551 (1985)) can be used to derive the frequency dependent time or phase delay due to velocity dispersion as a function of the attenuation. If the travel time without attenuation is $\tau_k$, then with attenuation the time delay becomes $$\text{Delay}(f) = \tau_k(1 + \alpha_k \ln(\overline{\omega}/\omega)/\pi), \tag{15}$$

where $\overline{\omega}$ is a reference frequency related to the data Nyquist frequency or other high frequency and is greater than the frequency $\omega$. Note that in Equation 15, higher frequencies are less delayed than low frequencies, i.e. it is dispersive. Being able to relate the frequency dependence of the time delay to the amplitude attenuation is a consequence of causality. Now a model function for the data in the frequency domain is given by $$P(\omega) = S(\omega) * \sum_{k=1}^{N} z_k e^{-\omega \alpha_k \tau_k/2} e^{-i\omega \tau_k (1 + \alpha_k \ln(\overline{\omega}/\omega)/\pi)} \tag{16}$$

Figure 4:
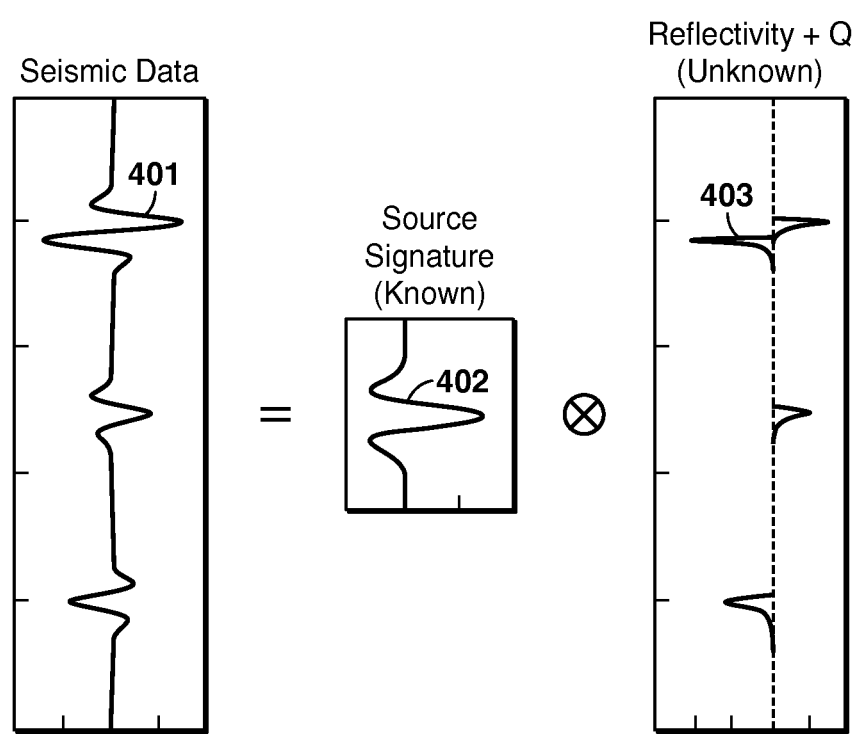
FIG. 4 is an illustration of a new convolutional model, which incorporates attenuation according to the present invention.

Here the source $S(\omega)$ (See 402 in FIG. 4) is assumed known as well as a reference frequency $\overline{\omega}$. The first exponential $e^{-\omega \alpha_k \tau_k/2}$ represents the frequency-dependent amplitude loss from attenuation. The second exponential term $e^{-i\omega\tau_k(1+\alpha_k \ln(\overline{\omega}/\omega)/\pi)}$ represents the phase delay from velocity dispersion. There are three model parameters per reflection event k, which are zk, αk, τk. Each event is no longer a simple spike, but is a spike modified by amplitude attenuation and velocity dispersion. The dispersion causes the low frequencies to come in later than the high frequencies as illustrated at 403 in FIG. 4. Note that without the causality assumption, an additional parameter would be needed for velocity dispersion effects in Equation 16. FIG. 4, which is an illustration of the current invention, can be compared to the corresponding illustration of the prior art in FIG. 2. The model parameters are determined by minimizing the misfit (Eq. 3) between the model data traces to the measured data traces 401 over all frequencies within a frequency band with a good signal-to-noise ratio. While Equation 16 describes a single trace, it is within the scope of the invention to incorporate similar formulation within a multi-trace inversion, including extra parameters such as hyperbolic moveout or AVO parameters. It is also within the scope of the invention to use more complex rock-physics-based expressions for attenuation (e.g. F(αk, τk) in Eq. 14) as a function of frequency.

Figure 5:
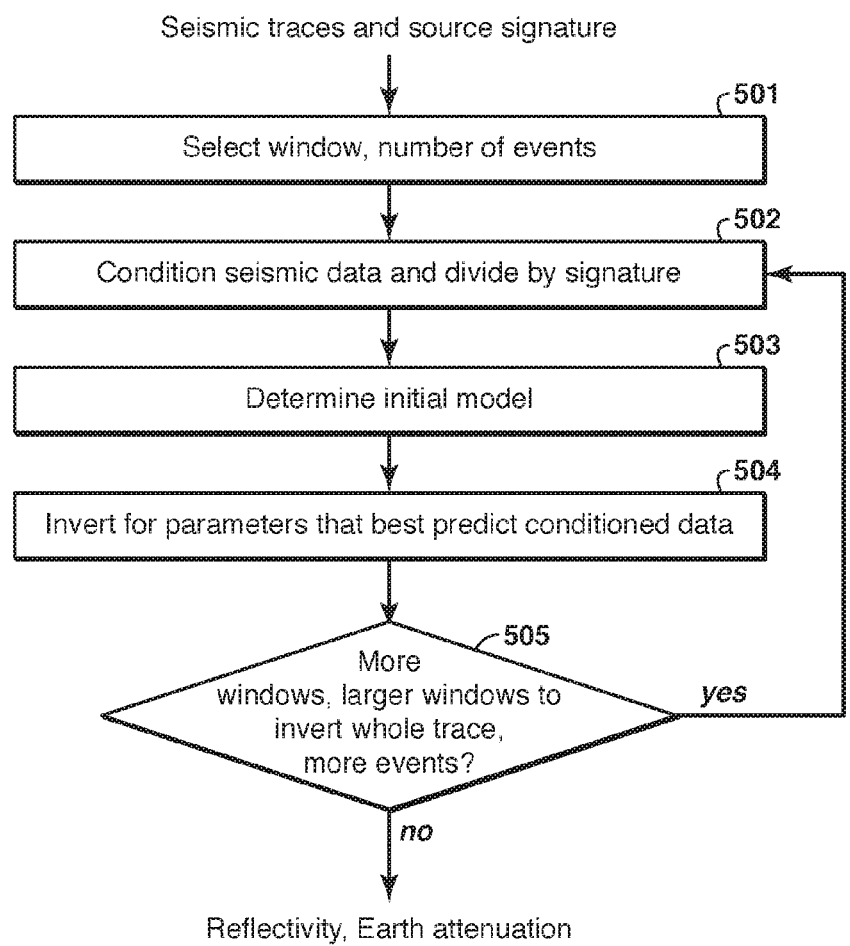
FIG. 5 is a flowchart showing basic steps for performing a particular embodiment of step 302 in FIG. 3.
Figure 8:
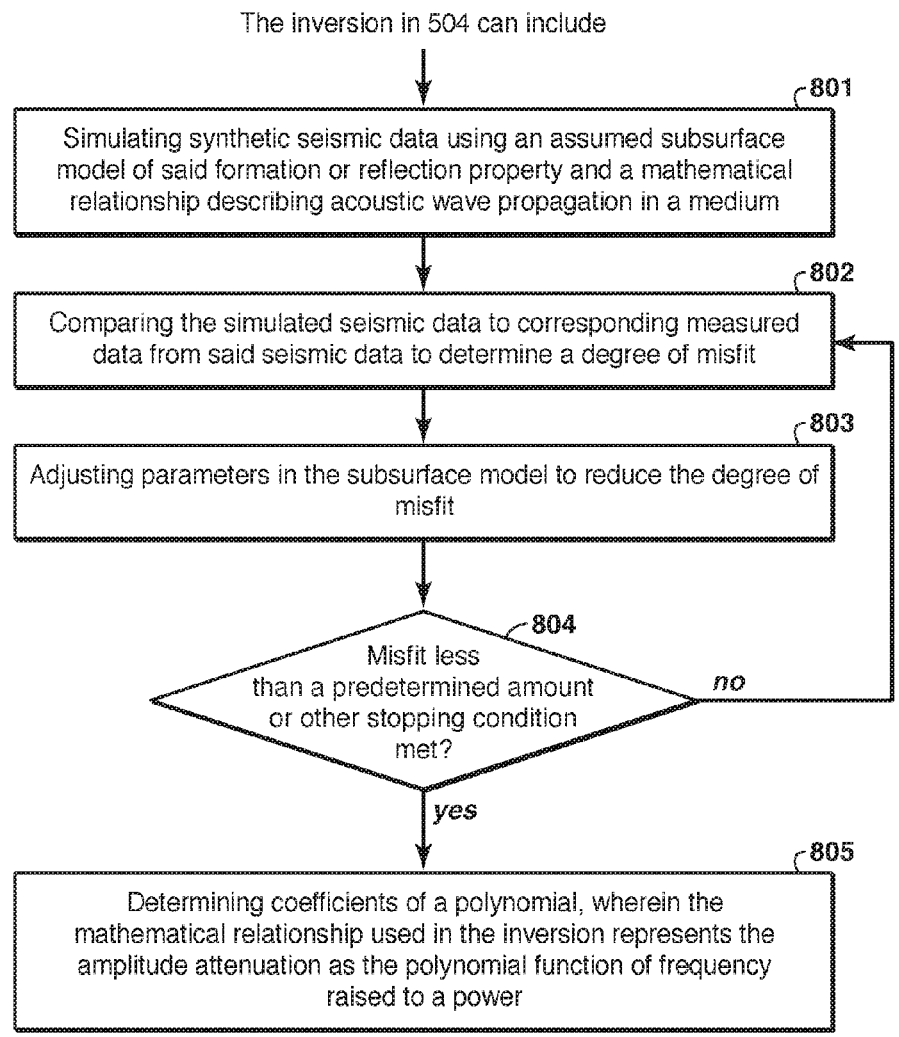
FIG. 8 illustrates steps included within step 504 of FIG. 5.

In one embodiment of the invention, step 302 can be implemented as described in more detail in FIG. 5. First an optional time window and the maximum number of events are selected in step 501. The data are then conditioned in step 502, which may include converting the data to the frequency domain and dividing by known estimates of the source signature and any known instrument or processing filters. In Step 503, an initial model is constructed, from early inversions or from other analyses. These analyses may involve picking times for local maxima of the time-domain waveforms and choosing the maximum amplitude at that time for the reflection coefficient, and assuming a high Q value. Alternatively, traditional sparse-spike inversion can be performed to obtain an initial estimate. Then the data are inverted to determine model parameters in step 504. Preferably an objective function is used that includes the misfit between model and data traces (i.e. Eq. 3) as well as constraints, bounds, and regularization terms. Preferably an L1 norm is used, but any norm is within the scope of the invention. As shown in FIG. 8, the inversion in 504 can include step 801 of simulating synthetic seismic data using an assumed subsurface model of said formation or reflection property and a mathematical relationship describing acoustic wave propagation in a medium, then step 802 of comparing the simulated seismic data to corresponding measured data from said seismic data to determine a degree of misfit, then the step 803 of adjusting parameters in the subsurface model to reduce the degree of misfit, and repeating until the misfit is less than a predetermined amount or other stopping condition is met (804). Step 805 includes determining coefficients of a polynomial, wherein the mathematical relationship used in the inversion represents the amplitude attenuation as the polynomial function of frequency raised to a power. In Step 505, the decision is made whether to optionally repeat steps 501 to 504 with longer time windows or events. Preferably, a small number of events and short early time windows are used with early iterations and a larger number of events and larger time windows are used with later iterations, eventually inverting the whole trace.

Once the parameters are determined, they may be edited by recognizing anomalous values that correspond to noise events and removing them. For, example at later times, large amplitudes are unlikely to be reflections, and these events can be eliminated. Then, the reflection coefficients and times can be used to generate a total impedance curve. Alternatively, they can be used to generate a broader band seismic trace without Q effects for further processing such as migration or water-bottom multiple elimination. The effective Q values, which are an integral over the full travelpath, may also be used to derive interval Q values to characterize the properties of the formations in the same manner that interval velocities are obtained from average velocities. The parameters may be used as input into further inversions or characterizations, for example to generate an initial model for travel-time tomography or full wavefield inversion, which invert directly for a layer-based interval attenuation quality factors and velocities instead of the effective earth filter determined in this invention.

Example

Figure 6A:
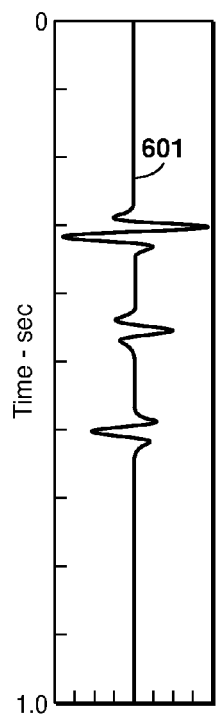
FIGS. 6A-6D illustrate a model example in which the seismic data (6A) are inverted to find both the reflectivity (6B), and attenuation function 1/Q (6C) for each event, and integration of the reflectivity gives the total impedance (6D)
Figure 6B:
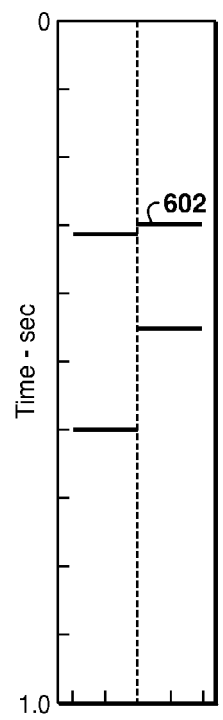
Figure 6C:
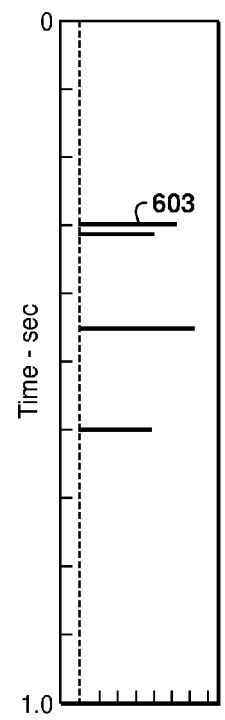
Figure 6D:
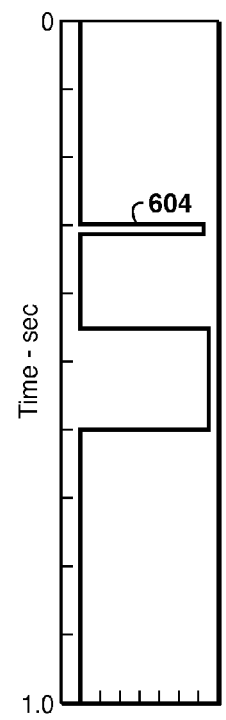
Figure 7A:
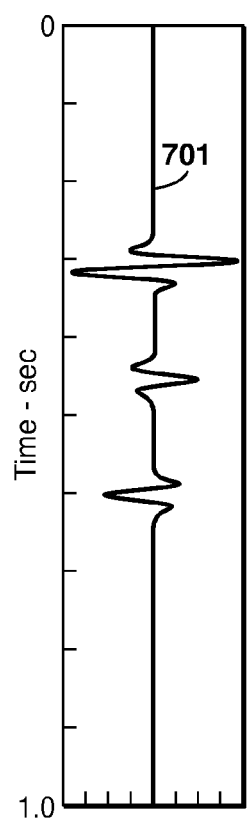
FIGS. 7A-7C show an example in which the original data trace (7A) is corrected to add low frequencies and compensate for attenuation to yield an improved data trace (7B), which when integrated (7C) matches the true total impedance for the model.
Figure 7B:
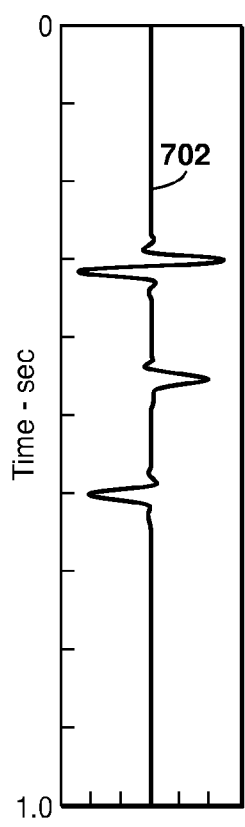
Figure 7C:
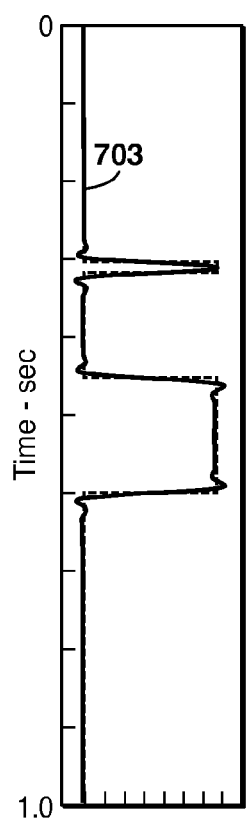

An example is shown in FIGS. 6A-6D. The seismic data trace 601 in FIG. 6A is the same as shown as 103 in FIG. 1. The band-limited source signature 101 is assumed, and the data inverted for values of reflection coefficients, time delay and attenuation (1/Q). The reflection coefficients 602 in FIG. 6B are plotted as a function of the travel time, and the attenuation 603 in FIG. 6C is also shown as a function of the travel time. Integration of 602 can be performed which yields the total impedance 604 in FIG. 6D, which matches the model impedance 105. Alternatively, the forward model can be computed from 602 using the desired broad-band source signature 102, neglecting attention. This is shown as 702 in FIG. 7B, and can be compared to the original trace 701 in FIG. 7A. Now integration of 702 yields 703 in FIG. 7C, which is a good approximation of the original impedance 105.

The foregoing patent application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

What is claimed is:

1. A computer-implemented method for inverting seismic data to obtain reflection properties of a subsurface region, comprising:
   estimating or measuring a source signature for the seismic data; and
   using the source signature, inverting the seismic data simultaneously for a subsurface formation or reflection property and for amplitude attenuation or velocity dispersion effects or both, integrated over a ray-path from source to reflectors and to a receiver;
wherein, at least the inversion is performed using a computer, and the inversion transforms the seismic data into an interpretable model of the subsurface region.

2. The method of claim 1, wherein the seismic data are inverted for both amplitude attenuation and velocity dispersion effects, but the number of unknown variables in the inversion is reduced by using a causality assumption relating frequency dependence of the velocity dispersion to the amplitude attenuation.

3. The method of claim 1, wherein the inversion uses a causality relationship to couple and thereby constrain values of the amplitude attenuation and the velocity dispersion effects determined by the inversion.

4. The method of claim 1, further comprising using the subsurface formation properties or reflection properties or the amplitude attenuation or velocity dispersion effects for exploration for hydrocarbons.

5. The method of claim 1, wherein the inversion assumes that reflections are sparse.

6. The method of claim 1, wherein the subsurface formation or reflection property is acoustic velocity, acoustic impedance, or reflectivity.

7. The method of claim 1, wherein the inversion is iterative and the seismic data being inverted are limited by a time window, with the window becoming progressively larger as the iterations progress, until in a last iteration the window includes an entire trace of seismic data.

8. The method of claim 1, wherein the inversion comprises:
   simulating synthetic seismic data using an assumed subsurface model of said formation or reflection property and a mathematical relationship describing acoustic wave propagation in a medium, then comparing the simulated seismic data to corresponding measured data from said seismic data to determine a degree of misfit, then adjusting parameters in the subsurface model to reduce the degree of misfit, and repeating until the misfit is less than a predetermined amount or other stopping condition is met.

9. The method of claim 8, wherein the mathematical relationship represents the amplitude attenuation as a polynomial function of frequency raised to a power and the inversion determines coefficients of the polynomial.

10. The method of claim 8, wherein the inversion is sparse spike inversion and the mathematical relationship can be expressed in the following form:

$$p(t) = s(t) * \sum_{k=1}^{N} z_k F(\alpha_k - \tau_k),$$

wherein p(t) is seismic response, meaning pressure or particle velocity or acceleration, as a function of time; s(t) is the estimated or measured source signature as a function of time; * represents the convolution operator; N subsurface reflectors are labeled by integer index k; $z_k$ is reflection coefficient for reflector k; and $F(\alpha_k, \tau_k)$ represents an earth filter for the subsurface region which is a function of effective attenuation $\alpha_k$ and two-way travel time $\tau_k$ from the source to reflector k and then to the receiver.

11. The method of claim 10, wherein unknown quantities found in the inversion are $\alpha_k$, $\tau_k$, and $z_k$.

12. The method of claim 10, wherein said mathematical relationship, after being transformed into frequency domain, can be written as $$P(\omega) = S(\omega) * \sum_{k=1}^{N} z_k e^{-\omega \alpha_k \tau_k / 2} e^{-i\omega \tau_k (1 + \alpha_k \ln(\bar{\omega}/\omega)/\pi)}$$

where $\bar{\omega}$ is a reference frequency greater than frequency $\omega$, and $\alpha_k = 1/Q_k$, where $Q_k$ is an effective quality factor that is constant as a function of the frequency $\omega$.

13. The method of claim 12, wherein causality is assumed, and the velocity dispersion effects are expressed as a frequency-dependent time delay given by Delay$(f) = \tau_k(1 + \alpha_k \ln(\bar{\omega}/\omega)/\pi)$ where $\bar{\omega}$ is a reference frequency greater than frequency $\omega = 2\pi f$.

* * * * *